United States Patent [19]

Hagin

[11] Patent Number: 4,731,997

[45] Date of Patent: Mar. 22, 1988

[54] DEVICE FOR STORING AND RELEASING ENERGY

[75] Inventor: Faust Hagin, Munich, Fed. Rep. of Germany

[73] Assignee: Man Nutzfahrzeuge GmbH, Munich, Fed. Rep. of Germany

[21] Appl. No.: 53,100

[22] Filed: May 22, 1987

[30] Foreign Application Priority Data

Jun. 11, 1986 [DE] Fed. Rep. of Germany ....... 3619639

[51] Int. Cl.$^4$ .............................................. F15B 1/04
[52] U.S. Cl. ...................................... 60/416; 60/405; 60/487
[58] Field of Search ................ 60/416, 405, 464, 476, 60/487

[56] References Cited

U.S. PATENT DOCUMENTS

| | | | |
|---|---|---|---|
| 3,204,573 | 9/1965 | Mercier | 60/416 |
| 3,496,879 | 2/1970 | Brandes | 60/416 |
| 3,971,215 | 7/1976 | Baron et al. | 60/464 |
| 4,142,368 | 3/1979 | Mantegani | 60/416 |
| 4,215,545 | 8/1980 | Morello et al. | 60/416 |

FOREIGN PATENT DOCUMENTS 385086 9/1973 U.S.S.R. .................................. 60/416

Primary Examiner—Robert E. Garrett
Attorney, Agent, or Firm—Roberts, Spiecens & Cohen

[57] ABSTRACT

In a system with an energy storing and releasing device the latter comprises a high pressure accumulator and switching over device for the charging and discharging of the latter from and to a low pressure accumulator using a hydraulic transducer which is connected with a device able to provide and take up power. The switching over device consists of four 2/1 way shut off valves of which two respective ones are placed in parallel and connected with a respective accumulator. The 2/1 way shut off valves are so connected with the hydraulic transducer that by paired switching of a respective one of the two 2/1 way shut off valves associated with one accumulator either the one or the other accumulator may be connected with the power input of the hydraulic transducer and switching over may take place from the power output of the latter to the other accumulator. By the use of simple 2/1 shut off valves the switching over device is generally simplified to a substantial extent.

5 Claims, 2 Drawing Figures

DEVICE FOR STORING AND RELEASING ENERGY

BACKGROUND OF THE INVENTION

The invention relates to a device for storing and releasing energy comprising a high pressure accumulator and a switch over device having two paths for the charging and discharging of the latter from and to a low pressure accumulator with the aid of a hydraulic transducer connected with means adapted to supply and to utilize energy with electrical control means and shut off valves to ensure that when the one said path is switched into an on condition the other path is switched into an off condition.

Known types of such energy storing and releasing devices have so far been so designed that, for bringing about the desired cooperation of the hydraulic transducer and the accumulators, relatively complex hydraulic switch over means are required between the accumulators and the ports of the hydraulic transducer. The accumulators themselves are each provided with a respective shut off valve. The valves required are relatively complex, and hence expensive, both as regards their individual structure and also as regards the system needed for operating them.

BRIEF SUMMARY OF THE INVENTION

Accordingly one object of the invention is to design a novel system for switching over the manner of operation of the hydraulic transducer and turning off the accumulators which is as simple as possible.

A further aim of the invention is to design such a system which is inherently suitable for the use of low-price components.

In order to achieve these or other objects of the invention appearing herefrom, the novel system is characterized by comprising: a high pressure accumulator, a low pressure accumulator, a hydraulic transducer adapted for connection with a system intermittently supplying and utilizing energy, a switch over device for causing charging and discharging of the high pressure accumulator from and into the low pressure accumulator with the aid of said hydraulic transducer through a first circuit path in one direction and through a second circuit path in the opposite direction, electrical means and shut off valves for shutting off one of the circuit paths and opening up the other and vice versa, two first parallel connected 2/1 way shut off valves associated with the high pressure accumulator, two second parallel connected 2/1 way shut off valves associated with the low pressure accumulator, first ports of said four 2/1 way shut off valves being connected with a feed line leading to the respective accumulator, second ports of two such 2/1 way shut off valves associated with each accumulator being connected with a power input of the hydraulic transducer, second ports of the respective other 2/1 way shut off valves being connected with the power output port of the hydraulic transducer, and means for paired switching of a respective one of the two 2/1 way shut off valves associated with one of such accumulators so that a selected one of the two accumulators is connected with the power input of the hydraulic transducer and the switching path is able to be built up from the power output of the hydraulic transducer to the other accumulator.

Due to the use of only four 2/1 shut off valves the result is a relatively simple switching over device consisting of low price valves. Owing to the circuit arrangement in the invention of the four 2/1 way shut off valves the shutting off or opening up of a line to the respective accumulator is furthermore possible.

Other developments and further features of the invention will be seen from the claims.

A more detailed account of the invention will now be given referring to the drawings.

DETAILED ACCOUNT OF THE INVENTION

Figure 1:
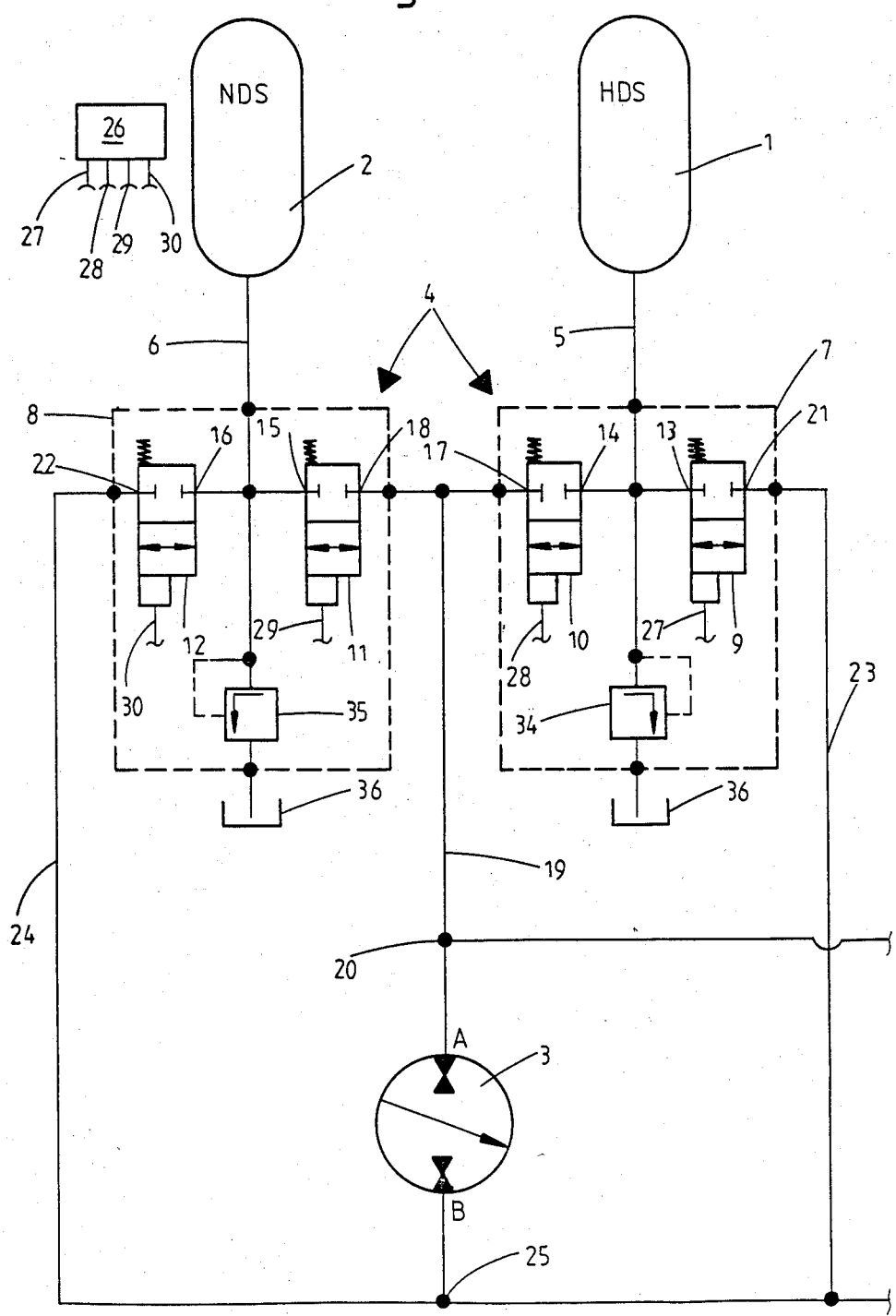
FIG. 1 shows a first embodiment of the energy storing and releasing device in accordance with the invention.

In the figures similar parts are provided with the same reference numerals in order to render the following account more straightforward.

The energy storing and releasing means is for example part of a system for propelling a motor vehicle with a facility to recover braking energy. Such systems are generally taken herein to include such devices in which energy is released when certain sequences of deceleration take place, such energy being able to be stored and returned to the system when required.

Figure 2:
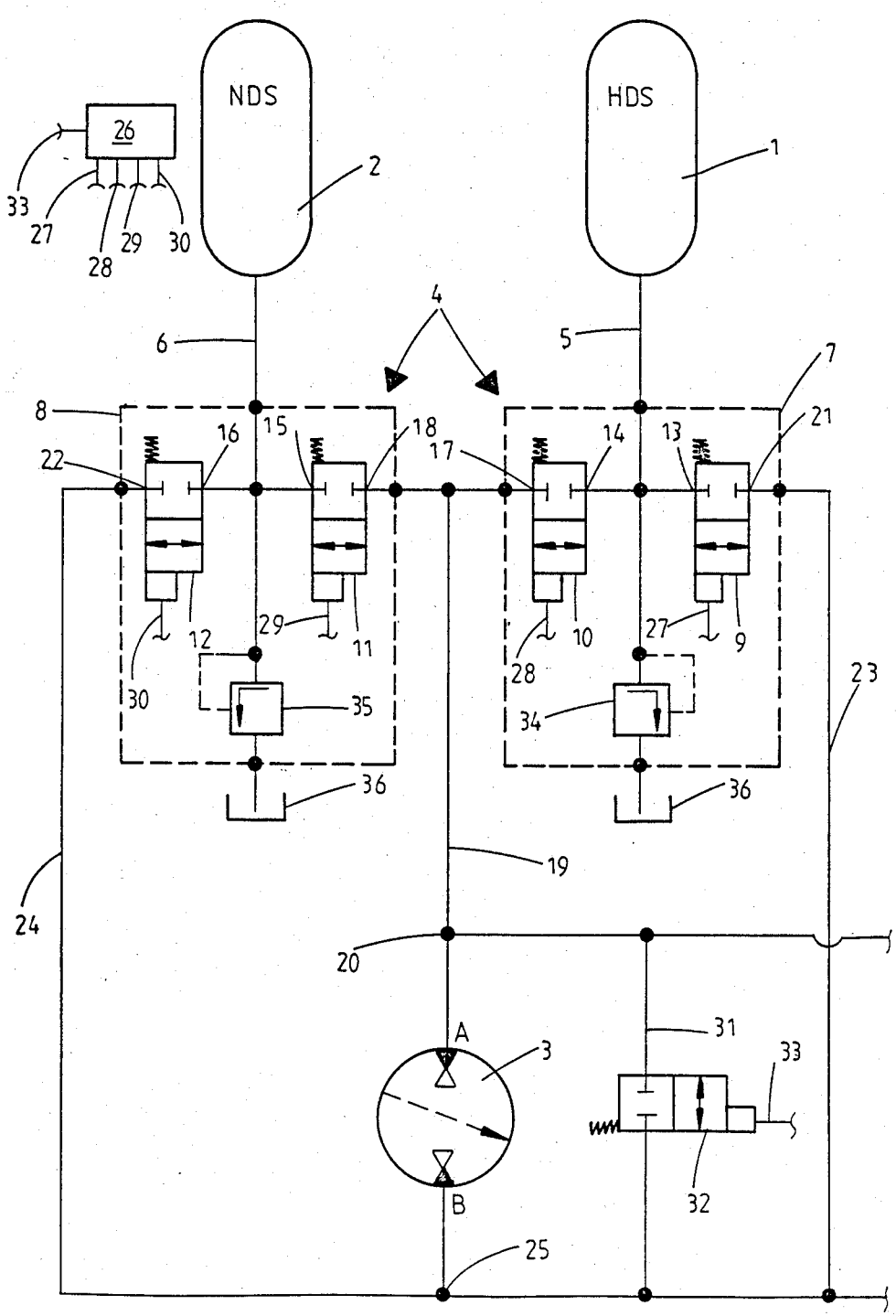
FIG. 2 shows a second working example of an energy storing and releasing device.

The energy storing and releasing device consists of a high pressure hydraulic accumulator 1, a low pressure hydraulic accumulator 2 and a hydraulic transducer 3 connected or to be connected with a power supplying and power using device. The accumulators 1 and 2 may be conventional bladder or piston accumulators. The hydraulic transducer 3 is also a commercially available unit such as an oblique shaft pump, a swash plate pump or a radial piston pump. The hydraulic transducer is preferably so designed that it may be operated both as a motor and as a pump. In the case of the working example of the invention shown in FIG. 1 the hydraulic transducer is a variable displacement device, adjustment taking place by changing the angle of rock, for example the angle of the swash plate in the case of a swash plate pump. In the case of the working embodiment of FIG. 2 the hydraulic transducer 3 is of a type which is either not adjustable at all or may not be adjusted so as to achieve zero displacement.

The high pressure accumulator 1 is associated with a switch over device generally referenced 4 and designed to charge and discharge the high pressure hydraulic accumulator 1 from and into the low pressure accumulator 2 with the aid of the hydraulic transducer 3 and to shut off and open up the feed lines 5 and 6 to and from the high pressure accumulator 1 and the low pressure accumulator 2. For this purpose each of the two accumulators 1 and 2 is provided with two parallel-connected 2/1 way shut off valves 9 and 10 and in the other case 11 and 12, which are preferably integrated in a case 7 and, respectively 8 (which are surrounded by chain lines). The two valves 9 and 10 integrated in the block 7 are associated with the high pressure accumulator 1 while on the other hand the two valves 11 and 12 are integrated in the block 8 and associated with the low pressure accumulator 2. The first port 13 of the 2/1 way shut off valve 9 and the first port 14 of the 2/1 way shut off valve 10 are connected with the accumulator feed line 5 leading to the high pressure accumulator 1. The first port 15 of the 2/1 way shut off valve 11 and the first port 16 of the 2/1 way shut off valve 12 are connected with the accumulator feed line 6 leading to the low pressure accumulator 2. The respective second ports of two 2/1 way shut off valves associated with the respective accumulators 1 and 2, that is to say the second port 17 of the 2/1 way shut off valve 10 and the second port 18 of the 2/1 way shut off valve 11 connect via a feed line 19 with the power input 20 of the hydraulic transducer 3. The respective second ports of the two other 2/1 way shut off valves, that is to say the second port 21 of the 2/1 way shut off valve 9 and the second port 22 of the 2/1 way shut off valve 12 are connected via a feed line 23 and 24, respectively, with the power output 25 of the hydraulic transducer 3. The 2/1 way shut off valves are preferably in the form of solenoid two-way valves. Each of the four 2/1 way shut off valves is connected with an electrical control device 26 via a separate, respective control line 27, 28, 29 or 30 so as to receive electrical control signals. By selective paired switching of one respective one of each of the two 2/1 way shut off valves associated with one accumulator, that is to say either the two 2/1 way valve 9 and 11 or the two 2/1 way shut off valves 10 and 12, it is possible for either the high pressure accumulator 1 or the low pressure accumulator 2 to be connected with the power input 20 of the hydraulic transducer 3 so that the switch path from the power output of the latter is able to be connected with the respective other accumulator 1 and 2. This provides a simple way of controlling the charging and discharging of the high pressure accumulator 1. Furthermore the accumulator lines 5 and 6 may be shut down with the aid of the two respective 2/1 way shut off valve 9 and 10 or, in the other case, 11 and 12. In order for this charging and discharging of the high pressure accumulator 1 to be possible in the case of the working example of FIG. 2 whose hydraulic transducer is not able to be adjusted at all or is not able to be set a zero displacement in all working ranges, there is a further 2/1 way shut off valve 32 placed in a parallel line 31 leading to the hydraulic transducer 3 so that the parallel line 31 may be opened and closed as needed. The operation of the 2/1 way shut down valve 32 is also by way of a suitable control line 33 coming from the controlling device 26.

In order to avoid overcharging the respective accumulator there is a pressure limiting valve 34 and 35 (connecting to a hydraulic oil tank 36), respectively, on each accumulator feed line 5 and 6. The pressure limiting valve 34 is set to a pressure which is permissible for the high pressure accumulator 1, whereas the pressure limiting valve 35 is set to the desired or permissible pressure for the low pressure accumulator 2. The pressure limiting valve is integrated in the block 7 and the pressure limiting valve 35 is integrated in the block 8. The arrangement of the valves in the blocks is generally such that the blocks 7 and 8 may readily be replaced by new ones and for this purpose the lines 5, 6, 19, 23 and 24 have quick release unions.

What is claimed is:

1. A device for the storing and releasing of energy comprising:
   a high pressure accumulator,
   a low pressure accumulator,
   a hydraulic transducer adapted for connection with a system intermittently
   supplying and utilizing energy,
   a switch over device for causing charging and discharging of the high pressure accumulator from and into the low pressure accumulator with the aid of said hydraulic transducer through a first circuit path in one direction and through a second circuit path in the opposite direction,
   electrical means and shut off valves for shutting off one of the circuit paths and opening up the other and vice versa,
   two first parallel-connected 2/1 way shut off valves associated with the high pressure accumulator,
   two second parallel-connected 2/1 way shut off valves associated with the low pressure accumulator, first ports of said four 2/1 way shut off valves being connected with a feed line leading to the respective accumulator, second ports of two such 2/1 way shut off valves associated with each accumulator being connected with a power input of the hydraulic transducer, second ports of the respective other 2/1 way shut off valves being connected with the power output port of the hydraulic transducer,
   and means for paired switching of a respective one of the two 2/1 way shut off valves associated with one of such accumulators so that a selected one of the two accumulators is connected with the power input of the hydraulic transducer and the switching path is able to be built up from the power output of the hydraulic transducer to the other accumulator.

2. The device as claimed in claim 1 wherein the 2/1 way shut off valves are formed by solenoid two-way valves connected with a control device by control lines.

3. The device as claimed in claim 1 wherein the two 2/1 way shut off valves associated with one respective one of the two accumulators are each integrated in a respective block.

4. The device as claimed in claim 1 wherein each accumulator feed line is connected with a pressure limiting valve which is connected with a hydraulic oil tank.

5. The device as claimed in claim 4 wherein the two respective pressure limiting valves are integrated in respective blocks, each such block having two such 2/1 way valves therein.

* * * * *

UNITED STATES PATENT AND TRADEMARK OFFICE
CERTIFICATE OF CORRECTION

PATENT NO. : 4,731,997
DATED : Mar. 22, 1988
INVENTOR(S) : Faust Hagin

It is certified that error appears in the above-identified patent and that said Letters Patent is hereby corrected as shown below:

On the title page assignee should read:

--(73)Assignee: Man Nutzfahrzeuge GmbH--.

Signed and Sealed this

Twenty-eighth Day of March, 1989

Attest:

DONALD J. QUIGG

*Attesting Officer*  *Commissioner of Patents and Trademarks*